(12) United States Patent
Shinzawa (10) Patent No.: US 11,453,254 B2
(45) Date of Patent: Sep. 27, 2022

(54) PNEUMATIC TIRE

(71) Applicant: The Yokohama Rubber Co., LTD., Tokyo (JP)

(72) Inventor: Tatsuro Shinzawa, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 250 days.

(21) Appl. No.: 16/766,637

(22) PCT Filed: Nov. 9, 2018

(86) PCT No.: PCT/JP2018/041674
§ 371 (c)(1),
(2) Date: May 22, 2020

(87) PCT Pub. No.: WO2019/102873
PCT Pub. Date: May 31, 2019

(65) Prior Publication Data
US 2020/0369099 A1 Nov. 26, 2020

(30) Foreign Application Priority Data

Nov. 22, 2017 (JP) .............................. JP2017-224714

(51) Int. Cl.
*B60C 19/00* (2006.01)
*B60C 11/13* (2006.01)
(Continued)

(52) U.S. Cl.
CPC ........ *B60C 19/002* (2013.01); *B60C 11/0304* (2013.01); *B60C 11/13* (2013.01);
(Continued)

(58) Field of Classification Search
CPC .............. B60C 19/002; B60C 19/0304; B60C 2011/033
See application file for complete search history.

(56) References Cited

U.S. PATENT DOCUMENTS

2006/0231185 A1 10/2006 Tanno
2009/0199942 A1* 8/2009 Tanno .................. B29C 66/304
152/157
(Continued)

FOREIGN PATENT DOCUMENTS

JP 4281874 6/2009
JP 2009-298314 * 12/2009
(Continued)

OTHER PUBLICATIONS

English machine translation of JP2015-107691. (Year: 2015).*
International Search Report for International Application No. PCT/JP2018/041674 dated Feb. 5, 2019, 4 pages, Japan.

*Primary Examiner* — Robert C Dye
(74) *Attorney, Agent, or Firm* — Thorpe North & Western (57) ABSTRACT

Provided is a pneumatic tire, a mounting direction of which is specified with respect to a vehicle, which includes: a tread portion extending in a tire circumferential direction and having an annular shape; a pair of sidewall portions disposed on both sides of the tread portion; and a pair of bead portions disposed inward of the sidewall portions in a tire radial direction; wherein a sound absorbing member is fixed via an adhesive layer to an inner surface of the tread portion along the tire circumferential direction, and a center position in a width direction of the sound absorbing member is disposed on a vehicle outer side.

10 Claims, 3 Drawing Sheets

(51) Int. Cl.
 *B60C 11/03* (2006.01)
 *B60C 11/00* (2006.01)
(52) U.S. Cl.
 CPC ............... *B60C 2011/0033* (2013.01); *B60C 2011/0355* (2013.01)

(56) References Cited

U.S. PATENT DOCUMENTS

| | | | |
|---|---|---|---|
| 2009/0277549 | A1 | 11/2009 | Tanno |
| 2010/0294406 | A1 | 11/2010 | Tanno |
| 2013/0048181 | A1 | 2/2013 | Benoit |
| 2016/0297260 | A1* | 10/2016 | Tanno ................ B29D 30/0061 |
| 2017/0008354 | A1 | 1/2017 | Sakamoto et al. |
| 2017/0313135 | A1* | 11/2017 | Ichimura .............. B60C 11/032 |
| 2018/0086158 | A1 | 3/2018 | Bauer |
| 2019/0030963 | A1 | 1/2019 | Shinzawa |
| 2019/0248191 | A1* | 8/2019 | Greco ................ B60C 11/0304 |

FOREIGN PATENT DOCUMENTS

| | | | |
|---|---|---|---|
| JP | 2010-269767 | | 12/2010 |
| JP | 2013-525203 | | 6/2013 |
| JP | 5267288 | | 8/2013 |
| JP | 2015-107691 | * | 6/2015 |
| JP | 2017-137032 | | 8/2017 |
| WO | WO 2005/012007 | | 2/2005 |
| WO | WO 2011/138282 | | 11/2011 |
| WO | WO 2015/111315 | | 7/2015 |
| WO | WO 2016/192861 | | 12/2016 |
| WO | WO 2017/135004 | | 8/2017 |

* cited by examiner

PNEUMATIC TIRE

TECHNICAL FIELD

The present technology relates to a pneumatic tire and more particularly relates to a pneumatic tire that is able to suppress the deterioration of high-speed durability by alleviating accumulation of heat due to the application of the sound absorbing member while obtaining a sound absorbing effect by the sound absorbing member.

BACKGROUND ART

Cavernous resonance caused by vibration of air in a tire cavity portion is one cause of tire noise. Cavernous resonance occurs when a tread portion of a tire that comes into contact with a road surface when the vehicle is traveling vibrates due to the unevenness of the road surface and the vibration vibrates the air in the tire cavity portion. Since sound in a particular frequency band of the cavernous resonance is perceived as noise, it is important to reduce the level of sound pressure (noise level) in the frequency band and reduce cavernous resonance.

A known technique of reducing noise caused by such cavernous resonance includes mounting a sound absorbing member made of a porous material such as sponge on an inner surface of a tread portion on a tire inner surface using an elastic band (for example, see Japan Patent No. 4281874). However, in a case where the sound absorbing member is fixed with the elastic band, the elastic band may be deformed during travel at high speeds.

Another known method includes directly adhering and fixing a sound absorbing member to a tire inner surface has been proposed (for example, see Japan Patent No. 5267288). However, in this case, the sound absorbing member is directly adhered to the tire inner surface, so the accumulation of heat occurs in the tread portion, and there is a problem in that high-speed durability deteriorates due to the accumulation of heat.

SUMMARY

The present technology provides a pneumatic tire that is able to suppress the deterioration of high-speed durability by alleviating the accumulation of heat due to the application of a sound absorbing member while obtaining the sound absorbing effect by the sound absorbing member.

In the present technology, a pneumatic tire, a mounting direction of which is specified with respect to a vehicle, includes: a tread portion extending in a tire circumferential direction and having an annular shape; a pair of sidewall portions disposed on both sides of the tread portion; and a pair of bead portions disposed inward of the sidewall portions in a tire radial direction; a sound absorbing member being fixed via an adhesive layer to an inner surface of the tread portion along the tire circumferential direction, and a center position in a width direction of the sound absorbing member is disposed on a vehicle outer side, so it is possible to suppress the deterioration of the high-speed durability of the pneumatic tire while obtaining the sound absorbing effect of the sound absorbing member.

In general, since a negative camber angle is set for a high load and high power vehicle, the ground contact pressure on the vehicle outer side tends to be lower, so the accumulation of heat in the tread portion is less likely to occur on the vehicle outer side than on the vehicle inner side. Therefore, when disposing the sound absorbing member on the tire inner surface, disposing the sound absorbing member toward the vehicle outer side does not promote the accumulation of heat in the tread portion, and thus, by offsetting and disposing the sound absorbing member on the vehicle outer side as described above, the accumulation of heat caused by bonding the sound absorbing member may be alleviated, and deterioration in high-speed durability may be suppressed.

In the pneumatic tire described above, at least two circumferential grooves are disposed in the tread portion and extending in the tire circumferential direction, and lug grooves are disposed in shoulder regions of the tread portion and extending in a tire width direction; when a ratio of a distance from a tire equator to the center position in the width direction of the sound absorbing member with respect to a distance from the tire equator to a ground contact edge of the tread portion is defined as an offset amount CR, when an average value between a groove depth of a deepest portion of the lug groove on a vehicle inner side and a groove depth of the circumferential groove on the vehicle inner side is defined as an average groove depth GDin on the vehicle inner side, and when the average value between a groove depth of a deepest portion of the lug groove on the vehicle outer side and a groove depth of the circumferential groove on the vehicle outer side is defined as an average groove depth GDout on the vehicle outer side, the average groove depth GDout on the vehicle outer side is smaller than the average groove depth GDin on the vehicle inner side, and the offset amount CR, the average groove depth GDin on the vehicle inner side, and the average groove depth GDout on the vehicle outer side preferably satisfy Formula (1) below.

$$0.05 < CR < (GDout/GDin) \times 0.5 \quad (1)$$

Additionally, in the pneumatic tire described above, a negative camber angle CA when mounted on a vehicle is assumed to be from 1° to 4°, and the negative camber angle CA, the offset amount CR, the average groove depth GDin on the vehicle inner side, and the average groove depth GDout on the vehicle outer side preferably satisfy Formula (2) below.

$$0.2/CA < CR < (GDout/GDin) \times 0.5 \quad (2)$$

Additionally, in the pneumatic tire described above, when an average value between under-groove gauges in the circumferential groove and in the lug groove on the vehicle inner side is defined as an average under-groove gauge UGin on the vehicle inner side and when an average value between under-groove gauges in the circumferential groove and in the lug groove on the vehicle outer side is defined as an average under-groove gauge UGout on the vehicle outer side, the average groove depth GDin on the vehicle inner side, the average groove depth GDout on the vehicle outer side, the average under-groove gauge UGin on the vehicle inner side, and the average under-groove gauge UGout on the vehicle outer side preferably satisfy Formula (3) below.

$$1.0 < (GDin - GDout)/(UGout - UGin) < 1.3 \quad (3)$$

Generally, in pneumatic tires having an asymmetric pattern, by reducing the groove depth of the grooves disposed on the vehicle outer side and making the groove volume on the vehicle outer side relatively small, improvement in steering stability on dry road surfaces and improvement in steering stability on wet road surfaces are achieved in a compatible manner. However, when the groove volume is low, the amount of rubber becomes large, and as a result, the accumulation of heat will easily occur; furthermore, when the sound absorbing member is disposed in excess with respect to a portion where the groove volume is small, the accumulation of heat is promoted, and the high-speed durability will be adversely affected. Therefore, in order to improve high-speed durability, it is effective to appropriately set the offset amount of the sound absorbing member with respect to the camber angle or the groove depth of the tread portion. Therefore, by disposing the sound absorbing member so as to satisfy Formulas (1) to (3) above, it is possible to effectively suppress the deterioration of high-speed durability.

In the present technology, a cross-sectional area of the sound absorbing member is preferably from 10% to 30% of a cross-sectional area of a tire cavity. Thus, the sound absorbing effect of the sound absorbing member can be sufficiently ensured, which leads to an improvement in quietness. The cross-sectional area of the tire cavity is the cross-sectional area of the tire cavity portion formed between the tire and the rim in a state where the tire is mounted on a regular rim and inflated to a regular internal pressure. However, when the tire is an original equipment tire, the cross-sectional area of the cavity portion is calculated using a genuine wheel to which the tire is mounted.

In the present technology, an end portion in the width direction of the sound absorbing member is preferably on the tire equator side of the ground contact edge of the tread portion. This makes it possible to effectively suppress the peeling of the sound absorbing member.

In an embodiment of the present technology, preferably the adhesive layer includes a double-sided adhesive tape, and the adhesive layer has a total thickness from 10 μm to 150 μm. Accordingly, the followability with respect to deformation during molding can be ensured.

In an embodiment of the present technology, preferably the sound absorbing member includes a missing portion at at least one section in the tire circumferential direction. Thus, the tire can endure, for a long period of time, expansion due to inflation of the tire or shear strain of an adhering surface due to contact and rolling of the tire.

In the present technology, the ground contact region of the tread portion is specified based on the ground contact width in a tire axial direction measured when a regular load is applied and the tire is placed vertically on a plane, in a state where the tire is inflated to a regular internal pressure and mounted on a regular rim. The ground contact edge is an outermost position in the tire axial direction of the ground contact region. "Regular rim" is a rim defined by a standard for each tire according to a system of standards that includes standards on which tires are based, and refers to a "standard rim" in the case of JATMA (Japan Automobile Tyre Manufacturers Association, Inc.), refers to a "design rim" in the case of TRA (The Tire and Rim Association, Inc.), and refers to a "measuring rim" in the case of ETRTO (European Tire and Rim Technical Organization). "Regular internal pressure" is an air pressure defined by standards for each tire according to a system of standards that includes standards on which tires are based and refers to a "maximum air pressure" in the case of JATMA, refers to the maximum value in the table of "TIRE LOAD LIMITS AT VARIOUS COLD INFLATION PRESSURES" in the case of TRA, and refers to the "INFLATION PRESSURE" in the case of ETRTO; however, in a case where the tire is an original equipment tire, the air pressure which is displayed on the vehicle is used, and when the tire is of a passenger vehicle, the air pressure is 180 kPa. "Regular load" is a load defined by a standard for each tire according to a system of standards that includes standards on which tires are based and refers to a "maximum load capacity" in the case of JATMA, refers to the maximum value in the table of "TIRE LOAD LIMITS AT VARIOUS COLD INFLATION PRESSURES" in the case of TRA, and refers to "LOAD CAPACITY" in the case of ETRTO; however, in a case of an original equipment tire, the front and rear axle loads described in the vehicle inspection certificate are each divided by 2 to obtain a wheel load, and when the tire is of a passenger vehicle, the load is equivalent to 88% of the load.

DETAILED DESCRIPTION

Figure 1:
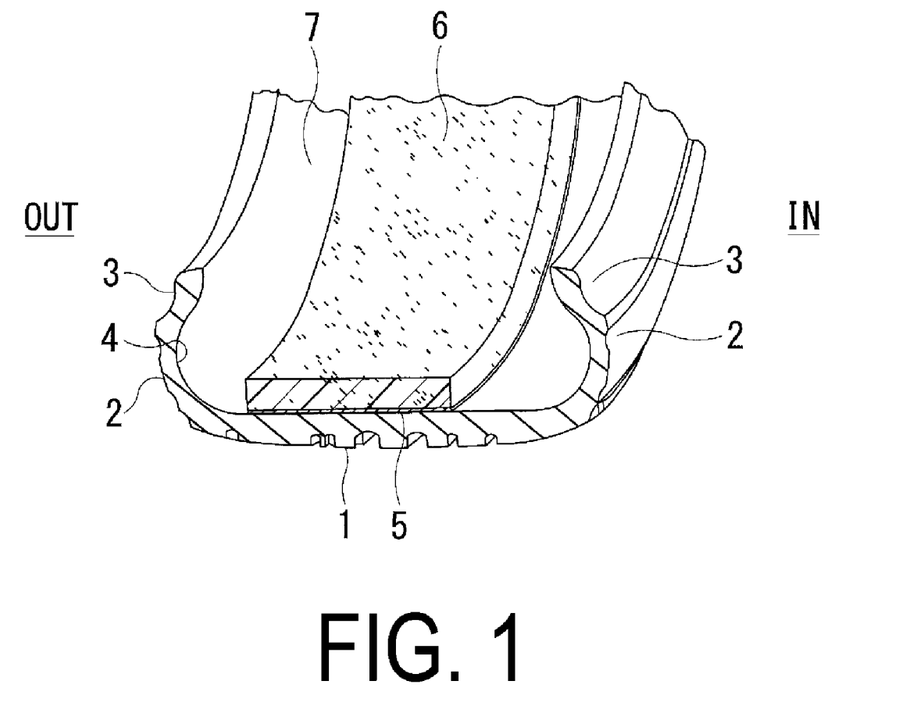
FIG. 1 is a perspective cross-sectional view of a pneumatic tire according to an embodiment of the present technology.
Figure 2:
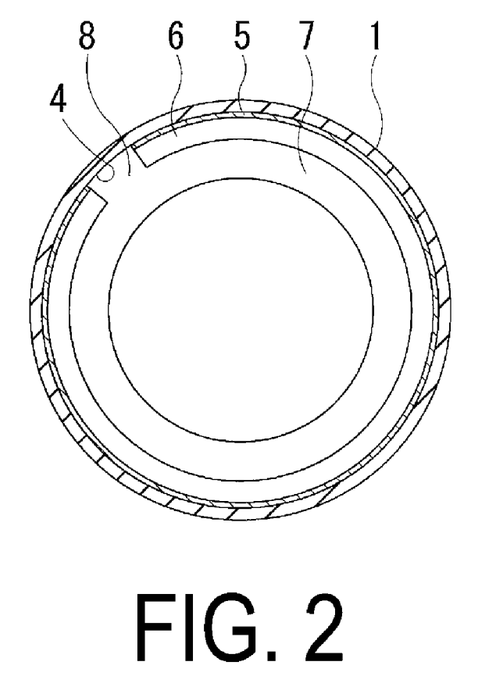
FIG. 2 is a cross-sectional view taken along an equator line of a pneumatic tire according to an embodiment of the present technology.
Figure 3:
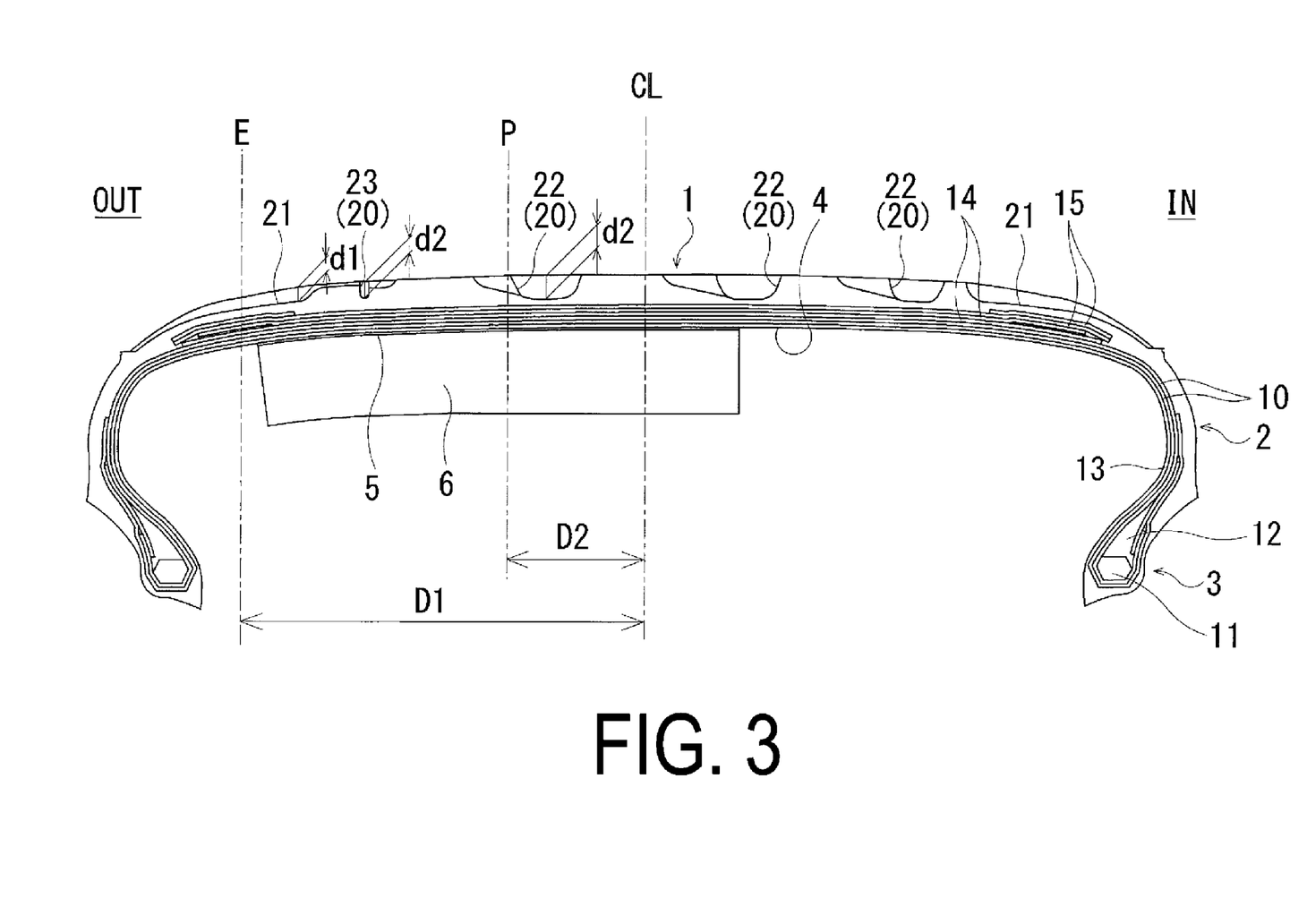
FIG. 3 is a meridian cross-sectional view illustrating a pneumatic tire according to an embodiment of the present technology.

Configurations of embodiments of the present technology will be described in detail below with reference to the accompanying drawings. FIG. 1 to FIG. 3 illustrate a pneumatic tire according to an embodiment of the present technology. In FIG. 1 and FIG. 3, "IN" refers to a vehicle inner side when the tire is mounted on a vehicle and "OUT" refers to a vehicle outer side when the tire is mounted on the vehicle.

In FIG. 1 and FIG. 2, the pneumatic tire according to the present embodiment includes a tread portion 1 extending in the tire circumferential direction having an annular shape, a pair of sidewall portions 2 disposed on both sides of the tread portion 1, and a pair of bead portions 3 disposed inward of the sidewall portions 2 in the tire radial direction.

In the pneumatic tire as described above, a sound absorbing member 6 is fixed along the tire circumferential direction to a region of a tire inner surface 4 corresponding to the tread portion 1, via an adhesive layer 5. The sound absorbing member 6 is made of a porous material with open cells and has predetermined noise absorbing properties based on the porous structure. Polyurethane foam is preferably used as the porous material of the sound absorbing member 6. On the other hand, the adhesive layer 5 is not particularly limited, and for example, an adhesive or double-sided adhesive tape may be used as the adhesive layer 5.

As illustrated in FIG. 3, at least one carcass layer 10 is mounted between the pair of bead portions 3, 3. The carcass layer 10 includes carcass cords arranged in the tire radial direction, and organic fiber cords are preferably used as the carcass cords. The carcass layer 10 is turned up around a bead core 11 disposed in each of the bead portions 3 from the inner side to the outer side of the tire. A bead filler 12 having a triangular cross-sectional shape is disposed on the tire outer circumferential side of each of the bead cores 11. Furthermore, an innerliner layer 13 is disposed in a region between the pair of bead portions 3, 3 on the tire inner surface.

On the other hand, belt layers 14 are embedded on the tire outer circumferential side of the carcass layer 10 in the tread portion 1. The belt layers 14 each include a plurality of reinforcing cords that are inclined with respect to the tire circumferential direction, with the reinforcing cords of the different layers arranged in a criss-cross manner. In the belt layers 14, the inclination angle of the reinforcing cords with respect to the tire circumferential direction ranges from, for example, from 10° to 40°. Steel cords are preferably used as the reinforcing cords of the belt layers 14. To improve high-speed durability, at least one belt cover layer 15 formed by arranging reinforcing cords at an angle of 5° or less with respect to the tire circumferential direction is disposed on the tire outer circumferential side of the belt layers 14. The belt cover layer 15 preferably has a jointless structure in which a strip material made from at least a single reinforcing cord laid out and covered with rubber is wound continuously in the tire circumferential direction. Moreover, the belt cover layer 15 may be disposed so as to cover the belt layer 14 in the width direction at all positions, or may be disposed to cover only the outer edge portions of the belt layer 14 in the width direction. Organic fiber cords of nylon, aramid, or the like are preferably used as the reinforcing cords of the belt cover layer 15.

Note that the tire internal structure described above represents a typical example for a pneumatic tire, and the pneumatic tire is not limited thereto.

The tread portion 1 is formed with at least two circumferential grooves 20 extending in the tire circumferential direction on both sides of the tire equator CL, and lug grooves 21 extending in the tire width direction in the shoulder region. The circumferential groove 20 includes a main circumferential groove 22 and a narrow circumferential groove 23. The configuration of the circumferential grooves 20 is not particularly limited; however, the configuration illustrated in FIG. 3 illustrates an example in which the tire equator CL has an asymmetrical pattern on both sides of the tire equator CL in the tread portion 1, two main circumferential grooves 22 are formed on the vehicle inner side, and one main circumferential groove 22 and one narrow circumferential groove 23 are formed on the vehicle outer side.

In the pneumatic tire described above, the sound absorbing member 6 is disposed offset to the vehicle outer side. That is, the center position P in the width direction of the sound absorbing member 6 is on the vehicle outer side of the tire equator CL. Additionally, an end portion in the width direction of the sound absorbing member 6 is preferably disposed on the tire equator CL side of a ground contact edge E of the tread portion 1 in order to suppress peeling of the sound absorbing member 6. In other words, both ends of the sound absorbing member 6 may be within the ground contact width.

The pneumatic tire described above includes the tread portion 1 that extends in the tire circumferential direction and has an annular shape, the pair of sidewall portions 2 disposed on both sides of the tread portion 1, and the pair of bead portions 3 disposed inward of the sidewall portions 2 in the tire radial direction. In the pneumatic tire for which the mounting direction to the vehicle is specified, the sound absorbing member 6 is fixed via the adhesive layer 5 to the inner surface of the tread portion 1 along the tire circumferential direction, and the center position P of the sound absorbing member 6 in the width direction is disposed on the vehicle outer side, so it is possible to suppress the deterioration of the high-speed durability of the pneumatic tire while obtaining the sound absorbing effect by the sound absorbing member 6.

In the pneumatic tire described above, as illustrated in FIG. 3, the distance from the tire equator CL to the ground contact edge E of the tread portion 1 is defined as a distance D1, a distance from the tire equator CL to the center position P of the sound absorbing member 6 in the width direction is defined as as a distance D2, and a ratio of the distance D2 with respect to the distance D1 is defined as an offset amount CR. Furthermore, an average value between a groove depth d1 of the deepest portion of the lug groove 21 on the vehicle inner side and a groove depth d2 of the circumferential groove 20 on the vehicle inner side is defined as an average groove depth GDin on the vehicle inner side, and the average value between a groove depth d1 of the deepest portion of the lug groove 21 on the vehicle outer side and a groove depth d2 of the circumferential groove 20 on the vehicle outer side is defined as an average groove depth GDout on the vehicle outer side. Note that the groove depth d1 of the lug groove 21 and the groove depth d2 of the circumferential groove 20 are groove depths measured in the normal direction of the tread surface.

At this time, the average groove depth GDout on the vehicle outer side is configured to be less than the average groove depth GDin on the vehicle inner side, and the offset amount CR, the average groove depth GDin on the vehicle inner side, and the average groove depth GDout on the vehicle outer side preferably satisfy Formula (1) below.

$$0.05 < CR < (GDout/GDin) \times 0.5 \tag{1}$$

In particular, the pneumatic tire is presumed to have a negative camber angle CA, when mounted on a vehicle, of from 1° to 4°, wherein the negative camber angle CA, the offset amount CR, the average groove depth GDin on the vehicle inner side, and the average groove depth GDout on the vehicle outer side preferably satisfy Formula (2) below. In other words, when the negative camber angle CA is set to be small, the offset amount CR is increased, and when the negative camber angle CA is set to be large, the offset amount CR is reduced.

$$0.2/CA < CR < (GDout/GDin) \times 0.5 \tag{2}$$

Furthermore, the average value between the under-groove gauges in the circumferential groove 20 and the lug groove 21 on the vehicle inner side is referred to as an average under-groove gauge UGin on the vehicle inner side, and the average value between the under-groove gauges in the circumferential groove 20 and the lug groove 21 on the vehicle outer side is an average under-groove gauge UGout on the vehicle outer side. At this time, the average groove depth GDin on the vehicle inner side, the average groove depth GDout on the vehicle outer side, the average under-groove gauge UGin on the vehicle inner side, and the average under-groove gauge UGout on the vehicle outer side preferably satisfy Formula (3) below. In other words, the average groove depth GDout on the vehicle outer side is relatively small, and the difference between the average under-groove gauge UGin on the vehicle inner side and the average under-groove gauge UGout on the vehicle outer side is not excessively large. By making (GDin−GDout)/(UGout−UGin) greater than 1.0, it is possible to dispose the sound absorbing member 6 offset to the vehicle outer side while avoiding excessive bias in the ground contact pressure between the vehicle inner side and the vehicle outer side. However, when (GDin−GDout)/(UGout−UGin) is 1.3 or greater, significantly uneven contact shape occurs and steering stability and quietness will be adversely affected, which is not preferable. Note that the under-groove gauge is the thickness of the tread rubber on the inner side in the tire radial direction of the groove bottom of the groove in the tire meridian cross section.

$$1.0 < (GDin-GDout)/(UGout-UGin) < 1.3 \tag{3}$$

Generally, in pneumatic tires having an asymmetric pattern, by reducing the groove depth of the grooves disposed on the vehicle outer side and making the groove volume on the vehicle outer side relatively small, improvement in steering stability on dry road surfaces and improvement in steering stability on wet road surfaces are achieved in a compatible manner. However, when the groove volume is low, the amount of rubber becomes large, and as a result, the accumulation of heat will easily occur; furthermore, when the sound absorbing member is disposed in excess with respect to a portion where the groove volume is small, the accumulation of heat is promoted, and the high-speed durability will be adversely affected. Therefore, in order to improve the high-speed durability, it is effective to appropriately set the offset amount of the sound absorbing member with respect to the camber angle or the groove depth of the tread portion. Therefore, by appropriately setting the offset amount CR or (GDin−GDout)/(UGout−UGin) so as to satisfy Formulas (1) to (3) above, it is possible to effectively suppress the deterioration of the high-speed durability.

The pneumatic tire described above preferably has a configuration in which the adhesive layer 5 is made of double-sided adhesive and the total thickness of the adhesive layer 5 is from 10 μm to 150 μm. By the adhesive layer 5 being configured as described above, the followability with respect to deformation during molding can be ensured. When the total thickness of the adhesive layer 5 is less than 10 μm, the strength of the double-sided adhesive tape is insufficient and the adhesiveness to the sound absorbing member 6 cannot be sufficiently ensured. When the total thickness of the adhesive layer 5 is greater than 150 μm, heat release is inhibited during travel at high speeds. Thus, high-speed durability easily deteriorates.

In a pneumatic tire, the cross-sectional area of the sound absorbing member 6 is preferably from 10% to 30% of the cross-sectional area of the tire cavity. Additionally, the width of the sound absorbing member 6 is preferably from 30% to 90% of the tire ground contact width. In this way, the sound absorbing effect of the sound absorbing member 6 can be sufficiently ensured, which leads to an improvement in quietness. Here, when the cross-sectional area of the sound absorbing member 6 is less than 10% of the cross-sectional area of the tire cavity, the sound absorbing effect cannot be appropriately obtained. Moreover, when the cross-sectional area of the sound absorbing member 6 is greater than 30% of the cross-sectional area of the tire cavity, the reduction effect against noise due to cavernous resonance becomes flat, and thus a further noise reduction effect may not be obtained.

As illustrated in FIG. 2, the sound absorbing member 6 preferably includes a missing portion 8 on at least one section in the tire circumferential direction. The missing portion 8 is a portion where the sound absorbing member 6 is not present along the tire circumference. The missing portion 8 is provided in the sound absorbing member 6. This allows for expansion due to inflation of the tire or shear strain of an adhering surface due to contact and rolling to be endured for a long period of time and for shear strain at the adhering surface of the sound absorbing member 6 to be effectively alleviated. One missing portion 8 or three to five missing portions 8 may be provided along the tire circumference. In other words, when two missing portions 8 are provided along the tire circumference, the tire uniformity significantly deteriorates due to mass unbalance, and when the six or more missing positions 8 are provided along the tire circumference, production costs significantly increase.

Note that in a case where two or more missing portions 8 are provided along the tire circumference, the sound absorbing member 6 is divided into portions in the tire circumferential direction. However, even in such a case, for example, the divided portions of the sound absorbing member 6 are connected to each other with another layer member such as the adhesive layer 5 made of double-sided adhesive tape. Thus, the sound absorbing member 6 can be treated as an integral member and can be easily applied to the tire inner surface 4.

EXAMPLES

The tires of Examples 1 to 5 were manufactured having: a tire size of 275/35ZR20, a tread portion in the tire circumferential direction having an annular shape, a pair of sidewalls disposed on both sides of the tread portion, and a pair of bead portions disposed on the inner sides of the sidewall portions in the tire radial direction; in the pneumatic tires for which the mounting direction to the vehicle is specified, a sound absorbing member was fixed via an adhesive layer to the inner surface of the tread portion along the tire circumferential direction, and the sound absorbing member was disposed offset to the vehicle outer side.

In Examples 1 to 5, the offset amount CR, GDout/GDin, (GDin−GDout)/(UGout−UGin), and the cross-sectional area ratios of the sound absorbing member were set as shown in Table 1. Note that the cross-sectional area ratio of the sound absorbing member is the ratio of the cross-sectional area of the sound absorbing member to the cross-sectional area of the tire cavity.

For comparison, a tire according to a Comparative Example 1 was prepared in which a sound absorbing member is not bonded to the tire inner surface. The tire of Comparative Example 2 was prepared having the same structure as that of Example 1 except that the sound absorbing member was disposed without being offset, and the tire of Comparative Example 3 was prepared having the same structure as that of Example 1 except that the direction in which the sound absorbing member was offset was different. Furthermore, the tire of Comparative Example 4 was prepared having the same structure as Example 1 except that the offset amount CR was different, and the tire of Comparative Example 5 was prepared having the same structure as Example 1 except that the offset amount CR and (GDin−GDout)/(UGout−UGin) were different.

For these test tires, high-speed durability with camber angle and resonance level were evaluated by the following test methods, and the results are shown in Table 1.

High-speed Durability with Camber Angle

Each test tire was mounted on a wheel having a rim size of 20×9½ J, and a running test was performed with a drum testing machine under the conditions of an air pressure of 340 kPa, a load of 5 kN, and a negative camber angle of 3°. More specifically, an initial speed of 250 km/h was used, the speed was increased by 10 km/h every twenty minutes, and the tires were run until the tires failed, after which the arrival step (speed) was measured. The larger the arrival step (speed) is, the more superior the high-speed durability with camber angle is.

Resonance Level

Each test tire was mounted on a wheel having a rim size of 20×9½ J and was mounted on a test vehicle at an air pressure of 250 kPa, after which the tire was run on a smooth road surface at a speed of 100 km/h, and sensory evaluation was performed by a test driver. Evaluation results are expressed as index values with the Comparative Example 2 being assigned an index value of 100. Larger index values indicate lower noise levels of cavernous resonance felt by the test driver and a greater noise reduction effect.

TABLE 1-1

|  | Comparative Example 1 | Comparative Example 2 | Comparative Example 3 |
|---|---|---|---|
| Presence of sound absorbing member | No | Yes | Yes |
| Offset direction | — | — | Vehicle inner side |
| Offset amount CR | — | 0 | 0.1 |
| GDout/GDin | 0.7 | 0.7 | 0.7 |
| GDin − GDout)/ (UGout − UGin) | 0.75 | 0.75 | 0.75 |
| Cross-sectional area ratio of sound absorbing member (%) | — | 20 | 20 |
| High-speed durability with camber angle [km/h] | 350 | 310 | 300 |
| Resonance level | 95 | 100 | 100 |

TABLE 1-2

|  | Example 1 | Example 2 | Example 3 | Comparative Example 4 |
|---|---|---|---|---|
| Presence of sound absorbing member | Yes | Yes | Yes | Yes |
| Offset direction | Vehicle outer side | Vehicle outer side | Vehicle outer side | Vehicle outer side |
| Offset amount CR | 0.1 | 0.2 | 0.3 | 0.4 |
| GDout/GDin | 0.7 | 0.7 | 0.7 | 0.7 |
| GDin − GDout)/ (UGout − UGin) | 0.75 | 0.75 | 0.75 | 0.75 |
| Cross-sectional area ratio of sound absorbing member (%) | 20 | 20 | 20 | 20 |
| High-speed durability with camber angle [km/h] | 320 | 330 | 320 | 310 |
| Resonance level | 100 | 100 | 100 | 100 |

TABLE 1-3

|  | Example 4 | Example 5 | Comparative Example 5 |
|---|---|---|---|
| Presence of sound absorbing member | Yes | Yes | Yes |
| Offset direction | Vehicle outer side | Vehicle outer side | Vehicle outer side |
| Offset amount CR | 0.2 | 0.3 | 0.4 |
| GDout/GDin | 0.7 | 0.7 | 0.7 |
| GDin − GDout)/ (UGout − UGin) | 1.0 | 1.2 | 1.4 |
| Cross-sectional area ratio of sound absorbing member (%) | 20 | 20 | 20 |
| High-speed durability with camber angle [km/h] | 340 | 350 | 350 |
| Resonance level | 100 | 100 | 96 |

As can be seen from Table 1, in comparison with Comparative Example 2, the pneumatic tires of Examples 1 to 5 had improved high-speed durability with camber angle while maintaining the resonance level.

In Comparative Example 1, the sound absorbing member was not bonded, so the resonance level deteriorated. In Comparative Example 3, the sound absorbing member was offset and bonded to the vehicle inner side, so high-speed durability with camber angle was adversely affected. In Comparative Example 4, since the offset amount CR of the sound absorbing member was set to a large value, the high-speed durability with camber angle was adversely affected. In Comparative Example 5, the offset amount CR and (GDin−GDout)/(UGout−UGin) of the sound absorbing member were set to be large, so the resonance level was deteriorated.

The invention claimed is:

1. A pneumatic tire, a mounting direction of which is specified with respect to a vehicle, comprising:
   a tread portion extending in a tire circumferential direction and having an annular shape;
   a pair of sidewall portions disposed on both sides of the tread portion; and
   a pair of bead portions disposed inward of the sidewall portions in a tire radial direction;
   a sound absorbing member being fixed via an adhesive layer to an inner surface of the tread portion along the tire circumferential direction, and
   a center position in a width direction of the sound absorbing member being disposed on a vehicle outer side; wherein
   at least two circumferential grooves are disposed in the tread portion and extending in the tire circumferential direction, and lug grooves are disposed in shoulder regions of the tread portion and extending in a tire width direction; and
   when a ratio of a distance from a tire equator to the center position in the width direction of the sound absorbing member with respect to a distance from the tire equator to a ground contact edge of the tread portion is defined as an offset amount CR, when an average value of groove depths of a deepest portion of a lug groove on a vehicle inner side and of a circumferential groove on the vehicle inner side is defined as an average groove depth GDin on the vehicle inner side, and when an average value of groove depths of a deepest portion of a lug groove on the vehicle outer side and of a circumferential groove on the vehicle outer side is defined as an average groove depth GDout on the vehicle outer side, the average groove depth GDout on the vehicle outer side is smaller than the average groove depth GDin on the vehicle inner side, and the offset amount CR, the average groove depth GDin on the vehicle inner side, and the average groove depth GDout on the vehicle outer side satisfy 0.05<CR<(GDout/GDin)×0.5 (1); and
   when an average value of under-groove gauges in the circumferential groove and in the lug groove on the vehicle inner side is defined as an average under-groove gauge UGin on the vehicle inner side and when an average value of under-groove gauges in the circumferential groove and in the lug groove on the vehicle outer side is defined as an average under-groove gauge UGout on the vehicle outer side, the average groove depth GDin on the vehicle inner side, the average groove depth GDout on the vehicle outer side, the average under-groove gauge UGin on the vehicle inner side, and the average under-groove gauge UGout on the vehicle outer side satisfy 1.0<(GDin−GDout)/(UGout−UGin)<1.3 (3).

2. The pneumatic tire according to claim 1, wherein
   a negative camber angle CA when mounted on a vehicle is assumed to be from 1° to 4°, and
   the negative camber angle CA, the offset amount CR, the average groove depth GDin on the vehicle inner side, and the average groove depth GDout on the vehicle outer side satisfy Formula (2):

$$0.2/CA < CR < (GDout/GDin) \times 0.5 \qquad (2).$$

3. The pneumatic tire according to claim 1, wherein a cross-sectional area of the sound absorbing member is from 10% to 30% of a cross-sectional area of a tire cavity.

4. The pneumatic tire according to claim 1, wherein an end portion in the width direction of the sound absorbing member is on a tire equator side of the ground contact edge of the tread portion.

5. The pneumatic tire according to claim 1, wherein the adhesive layer comprises a double-sided adhesive tape, and the adhesive layer has a total thickness from 10 μm to 150 μm.

6. The pneumatic tire according to claim 1, wherein the sound absorbing member comprises a missing portion on at least one section in the tire circumferential direction.

7. The pneumatic tire according to claim 2, wherein a cross-sectional area of the sound absorbing member is from 10% to 30% of a cross-sectional area of a tire cavity.

8. The pneumatic tire according to claim 7, wherein an end portion in the width direction of the sound absorbing member is on a tire equator side of the ground contact edge of the tread portion.

9. The pneumatic tire according to claim 8, wherein the adhesive layer comprises a double-sided adhesive tape, and the adhesive layer has a total thickness from 10 μm to 150 μm.

10. The pneumatic tire according to claim 9, wherein the sound absorbing member comprises a missing portion on at least one section in the tire circumferential direction.

\* \* \* \* \*